Aug. 17, 1926.  
W. DANNENBERG  
POULTRY FEEDING DEVICE  
Filed May 16, 1925
1,596,339
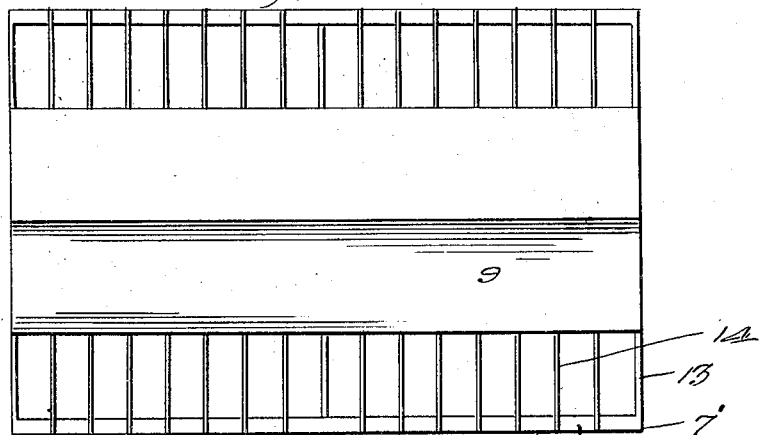
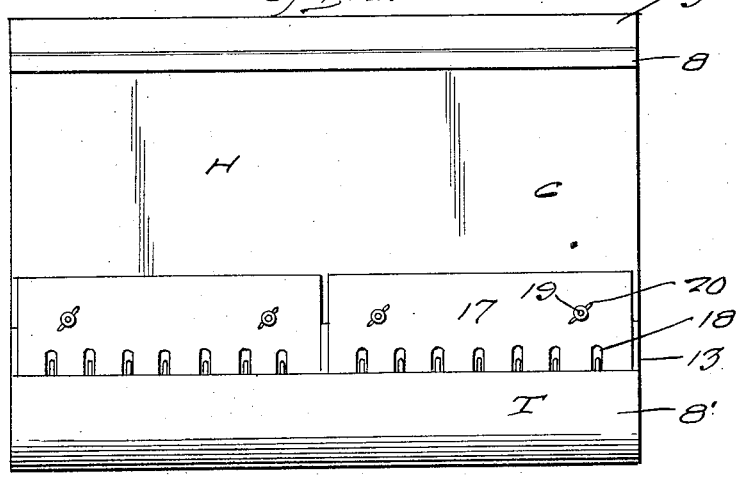
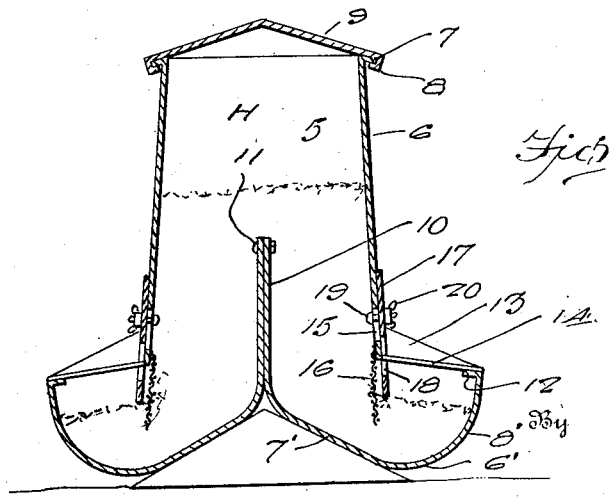

Patented Aug. 17, 1926.

1,596,339

UNITED STATES PATENT OFFICE.

WALTER DANNENBERG, OF HUBBARD, IOWA.

POULTRY-FEEDING DEVICE.

Application filed May 16, 1925. Serial No. 30,827.

The present invention relates to poultry feeding devices and aims to generally improve upon such structures.

An important object of my invention is to provide a stock feeding device of simple, durable and inexpensive construction, one which is thoroughly efficient and reliable, and well adapted to the purpose for which it is designed.

More particularly, it is my object to provide a poultry feeding device having adjustable means for regulating the flow of feed from the hopper into the feeding trough.

A further object of my poultry feeding device is to provide means for having only a portion of the total amount of feed exposed at any one time.

With these and other objects in view, my invention consists in the construction, and arrangement and combination of the various parts of the device, whereby the objects contemplated are attained, as hereinafter more fully set forth, claimed, and illustrated in the accompanying drawing, in which:

Figure 1 is a top plan view.

Figure 2 is a side elevation, and

Figure 3 is a transverse vertical section.

Referring to the drawing in detail, it will be seen that the letter H represents the hopper generally while the letters T represent the trough.

The hopper H is formed of two end walls 5 and two side walls 6 which preferably diverge from each other toward their bottom ends. The upper ends of the side walls 6 are provided with outwardly disposed flanges 7 with which slidably cooperate flanges 8 on the top 9. Thus the top 9 may be slid to an open position in order that feed may be placed in the hopper.

The troughs T are formed from the bottoms 6', each of which includes an inner inclined portion 7', and an outer upwardly curved portion 8'. The upper and inner end of the portion 7' merges into a dividing partition 10. The two partitions 10 are secured together by suitable fastening elements 11. The upper edges of the curved portions 8 are provided with inwardly extending flanges 12 which prevent the wastage of the feed as will be apparent as the description advances. Ends 13 are provided for the troughs, and complete the formation thereof. A plurality of spaced parallel rods 14 extend between each flange 12 and the adjacent lower edge of the adjacent side 6, and prevent the fowl from getting into the trough and also prevent the wastage of the feed.

A plurality of slots 15 are provided in the lower portions of the walls 6. Screen strips 16 extend downwardly from the lower edges of the walls 6 terminating a distance above the bottoms of the troughs T. Regulating plates 17 are provided with slot 18 for receiving the rods 14. Bolts 19 extend through these plates 17 and into the slots 15, and nuts 20 are provided thereon in order that the plates 17 may be adjusted to extend a desired distance into the troughs T and then the nuts may be tightened on the bolts to fix the plates in the adjusted position. Thus the amount of feed may be regulated as to the troughs T, that is the level of the feed in the troughs may be regulated as desired. The screen permits the feed to flow therethrough but prevents the feed from flowing too swiftly into the trough.

It is thought that the construction, operation, and advantages of the invention will now be clearly understood without a more detailed description. The structure prevents the hopper and troughs from becoming clogged, and a large supply of feed may be placed in the hopper, and yet the amount of feed exposed to the weather is very limited. The structure also prevents any excessive wastage of the feed by the poultry. The present embodiment of the invention has been disclosed merely by way of example, and it is apparent that some changes may be made in the construction and arrangement of the various parts of my feeding device without departing from the essential features and the purposes thereof, and it is my intention to cover by the claim of my patent any modified forms of the structure or use of mechanical equivalent which may be reasonably included within the scope of said claim.

Having thus described the invention, what I claim as new and desire to secure by Letters Patent is:—

In a feeding device of the class ascribed, a hopper including a side wall, a trough extending under the side wall a distance from the lower edge thereof, a foraminous sheet depending from the lower edge of the wall and terminating a distance above the bottom of the trough, and a plate adjustably mounted on the wall so as to extend downwardly alongside of the foraminous sheet.

In testimony whereof I affix my signature.

WALTER DANNENBERG.